US009189783B2

(12) United States Patent
Chowdhury et al.

(10) Patent No.: US 9,189,783 B2
(45) Date of Patent: Nov. 17, 2015

(54) WIRELESS MOBILE TRANSACTION SYSTEM AND THE PROCEDURE FOR CARRYING OUT TRANSACTIONS WITH A MOBILE PHONE

(75) Inventors: Amor Chowdhury, Gornja Radgona (SI); Milos Urbanija, Izlake (SI); Bojan Kotnik, Celje (SI); Dani Alyamour, Dubai (AE)

(73) Assignee: MARGENTO R&D D.O.O, Maribor (SI)

( * ) Notice: Subject to any disclaimer, the term of this patent is extended or adjusted under 35 U.S.C. 154(b) by 336 days.

(21) Appl. No.: 13/637,458

(22) PCT Filed: Jul. 16, 2010

(86) PCT No.: PCT/SI2010/000044
§ 371 (c)(1),
(2), (4) Date: Mar. 20, 2013

(87) PCT Pub. No.: WO2011/112158
PCT Pub. Date: Sep. 15, 2011

(65) Prior Publication Data
US 2013/0029646 A1    Jan. 31, 2013

(30) Foreign Application Priority Data

Mar. 10, 2010    (SI) .................................. P-201000082

(51) Int. Cl.
*G06Q 20/22* (2012.01)
*G06Q 20/32* (2012.01)

(52) U.S. Cl.
CPC ............... *G06Q 20/22* (2013.01); *G06Q 20/32* (2013.01)

(58) Field of Classification Search
CPC . H04L 63/08; H04L 63/0838; H04L 63/0861; H04L 63/0227; H04L 63/0853; H04L 63/10; H04L 63/102; H04L 65/60; H04L 67/18; H04L 67/26; H04L 67/303; H04L 67/306; H04L 69/22; H04L 9/30; G06Q 20/322; H04W 4/12; H04W 12/06; H04W 36/14; H04W 40/02; H04W 60/00; H04W 84/02; H04W 84/12; H04W 24/10; H04W 36/0077; H04W 36/38; H04W 48/17; H04W 4/00; H04W 4/02; H04W 4/14; H04W 60/04
USPC ........ 705/14, 16, 26.1, 76, 44, 39, 67, 71, 21, 705/38, 41, 64, 14.27, 14.65, 17, 40, 72, 705/7.29, 7.35, 13, 14.1, 14.15, 14.23, 705/14.31, 14.36, 14.38, 14.54, 14.55; 370/352, 389, 338, 392, 53, 328, 401; 455/41.2, 414.1, 435.1, 41.3, 436, 445, 455/435.2
See application file for complete search history.

(56) References Cited

U.S. PATENT DOCUMENTS

| | | | |
|---|---|---|---|
| 5,991,749 A | 11/1999 | Morrill, Jr. | |
| 8,792,305 B2* | 7/2014 | Booij | H04B 11/00 367/135 |
| 2001/0037264 A1 | 11/2001 | Husemann et al. | |
| 2002/0181710 A1 | 12/2002 | Adam et al. | |
| 2004/0267665 A1* | 12/2004 | Nam et al. | 705/41 |
| 2007/0022058 A1* | 1/2007 | Labrou et al. | 705/67 |
| 2007/0203792 A1* | 8/2007 | Rao | 705/14 |
| 2007/0265984 A1* | 11/2007 | Santhana | 705/65 |
| 2008/0172317 A1 | 7/2008 | Deibert et al. | |
| 2009/0061888 A1 | 3/2009 | Eonnet et al. | |
| 2009/0112768 A1 | 4/2009 | Hammad et al. | |
| 2009/0216676 A1 | 8/2009 | Mathur et al. | |
| 2009/0281904 A1* | 11/2009 | Pharris | 705/17 |

FOREIGN PATENT DOCUMENTS

| | | | |
|---|---|---|---|
| WO | 00/21203 A1 | 4/2000 | |
| WO | 02/33669 A1 | 4/2002 | |
| WO | 03/088165 A1 | 10/2003 | |

\* cited by examiner

*Primary Examiner* — Inder Mehra
(74) *Attorney, Agent, or Firm* — Baker & Hostetler LLP (57) ABSTRACT

The invention belongs to the field of systems for provision of computer-supported transactions with the use of a mobile phone, more exactly to the field of enabling universal communication between a telephone device, different transaction terminals and different servers including bank servers for carrying out certain transactions, considering all the security requirements against unauthorized access to an individual bank account or other user account. The core of the wireless mobile transaction system and the procedure for carrying out transactions with the mobile phone according to the invention is in the fact that the transfer of the transaction data between the user's mobile phone and the transaction processing center is done using a secure connection based on GPRS or UMTS data package transfer, whereas between the user's mobile phone and the shop's POS terminal the data is transferred using sound-modulated data transfer through an acoustic coupling or on the basis of infrared data association (IrDA) or Bluetooth wireless data connection or NFC contactless short-range communication technology or wireless internet connection WLAN. This way the user's mobile phone becomes a simple, safe and handy transaction instrument for carrying out financial transactions, such as electronic payment and transfer of funds, as well as non-financial transactions, such as using bonuses, collecting loyalty points and allowing and/or controlling access to secured areas, premises, buildings and similar. According to the invention the system is using operator's existent dedicated wireless data-transfer technology, such as GPRS or UMTS, for transferring data between the transaction processing center and the mobile phone, and is performing identification of the user with the certificate which is securely stored on the user's SIM card or in another secure memory of the mobile phone.

13 Claims, 3 Drawing Sheets

WIRELESS MOBILE TRANSACTION SYSTEM AND THE PROCEDURE FOR CARRYING OUT TRANSACTIONS WITH A MOBILE PHONE

REFERENCE TO RELATED APPLICATIONS

This application is a continuation of International Application No. PCT/SI2010/00044, filed Jul. 16, 2010, which claims the priority of Slovenian Patent Application No. P-20100082, filed Mar. 10, 2010, the entire contents of which applications are incorporated herein by reference.

FIELD OF THE INVENTION

The invention belongs to the field of systems for provision of computer-supported transactions with the use of a mobile phone, more exactly to the field of enabling universal communication between a telephone device, different transaction terminals and different servers, including bank servers, for carrying out certain transactions, considering all the security requirements against unauthorised access to an individual bank account or other user account.

BACKGROUND OF THE INVENTION

The posed technical problem is the conception of the system and the procedure based on a telecommunication-computer solution, which would enable reliable and secure connection between the user of the mobile phone, web or standard shop and the bank account or the bank card with the aim of making a certain entry into the database of the customer, shop and/or the bank. During the conception problems occurring with transfer of sound-modulated signals through the speech channel of the mobile network must be eliminated, which results also in higher reliability and speed of transactions.

SUMMARY OF THE INVENTION

The technical problem we have posed is enabling the transaction to be carried out with a mobile phone, providing the user of the mobile phone with a safe, reliable, fast and handy way of carrying out transactions. A transaction can here mean a financial transaction, where a transfer of monetary funds from one account to another is made, or a transfer of funds between two clients at a purchase, buying credits for different purposes, buying gift certificates and similar, as well as a non-financial transaction such as collecting and using loyalty points, allowing access, controlling access and similar. A modern mobile phone is nowadays an all-present and very widely used communication device, which because of its high processor power, different supported modes of connectivity such as GPRS (General Packet Radio Service), UMTS (Universal Mobile Telecommunications System), WLAN (Wireless Local Area Network), IrDA (Infrared Data Association), NFC (Near Field Communication), Bluetooth and similar, and more or less open own operation systems enables installation and start-up of different user software. The aim is to exploit all the abovementioned capacities and characteristics of a mobile phone and other communication structures for an additional function of a mobile phone which will replace a number of customer cards. The solution must eliminate the problems occurring in transferring sound-modulated signals through the speech channel of the mobile network, aiming for a reliable transfer and recognition of the signal, which is the basis for one of the abovementioned transactions.

Carrying out cashless transactions is in modern life an everyday activity. Various kinds of credit and debit cards, based on different principles of data storage and data exchange with the payment terminals, such as magnetic record, contact interface and contactless interface (the technology of contactless smart cards) are available to users. A user can thus often find a wide range of various payment cards in his/her wallet. If we add other transaction cards, such as bonus and loyalty cards many shops offer to their loyal customers, and access control cards many employers provide for their employees, the number of cards a user must handle, store and carry gets to a level, where they are difficult to manage.

The use of a mobile phone as a universal, handy and safe transaction instrument is already well recognized, as we shall see later with the description of the state of technology. The existent solution is however based on the transfer of sound-modulated data directly through the speech channel of the operator's mobile network. Modulation signal is thus the subject of characteristics of encoders used throughout the chain; from the mobile phone to the base stations all the way to the end centre, where the signal is recoded in the encoder used with ISDN or VoIP technologies. The greatest problem with this is the relatively high bandwidth required by the transfer of encoded speech, because of which in high load moments the base stations switch the encoder to one that requires lower bandwidth (e.g. a switch from GSM-EFR to GSM-HR). The problem occurs because encoding of sound-modulated data with lower bit-speed encoders quite irreversibly distorts the modulation signal, which increases the percentage of errors in demodulation of such modulation signal. The end result directly affects the users of the mobile transaction solution, as mobile transactions can last very long, even up to cca. 15 seconds or more, because the algorithms must execute demanding methods of forward error correction, which results in a lower effective usable bit-speed.

The patent document with ref. no. U.S. Pat. No. 5,991,749 and title >>Wireless Telephony for Collecting Tolls, Conducting Financial Transactions, and Authorizing Other Activities<< describes a system and procedures for carrying out different types of transactions using a mobile phone (analogue or digital), whereas the mobile phone must have inbuilt a special application that is capable to communicate with the central processing unit of the mobile operator using so called function codes. The amount used in the transaction is added to the user's invoice for mobile operator's services.

The proposed invention differs significantly from the patent with ref. no. U.S. Pat. No. 5,991,749 insofar as it is not using direct communication with the mobile operator's network by using function codes, but is using only the data packet transfer service offered by the mobile operator. The transaction actually takes place between the transaction processing centre and the mobile POS transaction terminal (Point of Sale Terminal), while the user's mobile phone serves only as an identification and communication mean to establish communication between the centre and the terminal and to transfer the transaction data. According to the invention the mobile phone application also does not need access to a lower level of communication between the operator's base station and the mobile phone, as it is only using the data packet transfer service such as: GPRS or UMTS.

The patent document with ref. no. US 2001/0037264 A1 and title >>Payment for Network-Based Commercial Transactions using a Mobile Phone<< describes a procedure of carrying out transactions using a personal computer and a mobile phone. The customer selects the desired product through the select option of the web application. The shop processes the selection and sends a message and demand for confirmation to the user's mobile phone in the form of an SMS or voice message. The customer confirms the order and the payment by sending an answer from its mobile phone, e.g. in the form of a return SMS message. After receiving confirmation the shop closes the order and forwards the amount to the mobile operator, which adds the payment amount to the invoice for client's mobile services.

The proposed invention differs significantly from the described patent with ref. no. US 2001/0037264 A1 (2001) insofar as it does not suggest a procedure for internet shopping. User's mobile phone is used for the identification of the user and a secure transfer of transaction data between the transaction centre and a mobile payment terminal. In the suggested solution the user must be physically present at the point of sale together with his/her mobile phone.

The patent document with ref. no. US 2002/0181710 A1 and title >>Mobile Transaction System and Method<< describes a mobile transaction system consisting of the service provider, the financial organization, the mobile network operator, the shop's POS terminal and the user with his/her mobile phone. The identification of the user is performed through the user's mobile phone and SMS messages or WAP protocol. The connection between the mobile phone and the shop's terminal is established through radiofrequency connection.

The proposed invention differs significantly from the described patent with ref. no. US 2002/0181710 A1 insofar as the identification of the user is not done through SMS messages and/or WAP protocol, but by using a certificate that is securely stored on the user's SIM card or other secure memory of the mobile phone. The transfer of transaction data between the user's mobile phone and the transaction processing centre is performed using a secure connection based on GPRS or UMTS data packet transfer, while between the user's mobile phone and the shop's POS terminal the data is transferred using sound-modulated data transfer through the acoustic coupling or infrared data transfer (IRDA) or on the basis of Bluetooth data connection or NFC (contactless short-range communication) technology or on the basis of wireless network connection WLAN.

The patent document with ref. no. US 2007/0265984 A1 and title >>Financial Transaction using Mobile Devices<< describes a system and a procedure for carrying out financial transactions using mobile devices, where each device includes a radiofrequency identification module for inter-communication, a module for storing digital certificates and a module supporting electronic wallet. Through interaction with the graphic interface the user of the first mobile device can safely transfer funds charged on his electronic wallet to an electronic wallet of the second mobile device, which is also equipped with the appropriate communication, security and application software.

The proposed invention differs significantly from the described patent with ref. no. US 2007/0265984 A1 insofar the credit of the electronic wallet is not saved on the mobile phone. The mobile phone serves in the proposed case as a communication and identification mean for transferring data between the transaction processing centre and the POS terminal.

The patent document with ref. no. US 2008/0172317 A1 and title >>Mobile Phone Payment with Disabling Feature<< describes a system and a procedure of mobile payment using a mobile phone with a time-conditioned disabling function. The disadvantage of contactless smart cards is that they are ready for data exchange every time they are in the radiofrequency field of the reading-writing device. This may lead to misuse of the data contained on the card. The solution described in the patent suggests the use of the mobile phone instead of the contactless smart card. The mobile phone must be equipped with a radiofrequency identification module, and the user application controls the transmitting-receiving part of the radiofrequency module. This way the use of a mobile phone as a contactless mean of payment is enabled in a secure way only when the user explicitly demands so. A special timer ensures the disabling of the phone as a mean of payment after a predefined period of time has expired.

The proposed invention differs significantly from the patent with ref. no. US 2008/0172317 A1 insofar as the mobile phone in it does not represent only a substitute for a contactless smart card but serves as a universal transaction mean. With the user's mobile phone secure identification is carried out as well as secure data transfer between the transaction centre and the POS terminal.

The patent document with ref. no. US 2009/0112768 A1 and title >>Payment transaction using Mobile Phone as Relay<< describes a system and a procedure of carrying out payment transactions, where the user's mobile phone is used as an additional security element when carrying out a transaction. The user first starts a special application on his/her mobile phone. The shop's POS terminal sends the transaction data to the mobile phone. The application on the mobile phone demands the user to enter his/her PIN code. The user's mobile phone then forwards the transaction data and the data on the user's identity to the bank that issued the user's account. When the issuing bank verifies the transaction data and the identity of the user, it sends a confirmation to the shop's POS terminal.

The proposed invention differs significantly from the described patent with ref. no. US 2008/0172317 A1 insofar as the mobile phone in the proposed invention does not represent only an additional security element when carrying out transactions, but serves as a communication and identification mean for a secure full-duplex transfer (exchange) of transaction data between the transaction centre and the wireless POS payment terminal. The additional protection when transferring transaction data is here the certificate, stored in a secure way on the SIM card or another secure memory of the user's mobile phone.

The patent document with ref. no. US 2009/0216676 A1 and title >>Integrated Mobile Transaction System and Methods Thereof<< describes a mobile transaction system and a procedure for carrying out transactions with, a mobile phone. The mobile phone has installed an application which enables connection to an integrated mobile transaction system through different interfaces (SMS, Voice, Web, VoiP). Using the application the desired sum can then be allocated to the selected service provider.

The proposed invention differs significantly from the described invention with ref. no. US 2009/0216676 A1 insofar as the mobile phone with the proposed invention serves only as an identification mean to identify the user and a communication mean for two-directional data transfer between the transaction processing centre and the shop's POS transaction terminal. This way the user does not need to enter any data on the selected service provider, the selected transaction or the amount of the transaction in its mobile phone. All the data is automatically determined when establishing the data connection between the transaction processing centre and the POS terminal, where the shop enters the amount of the payment. The proposed POS terminal enables simple integration with existent cash registers and the transaction is thus carried out in a faster, safer and more user-friendly way.

The patent document with the ref. no. US 2009/0281904 A1 and title >>Mobile Telephone Transaction Systems and Methods<< describes a transaction system and a procedure where users of mobile phones equipped with a special application enabling mobile payment, users of personal computers accessing the transaction server through a web browser, POS systems of various shops and automatic vending machines can be connected to the transaction server. The user of the mobile phone can carry out a financial transaction (transfer of funds from his/her bank account to e.g. shop's bank account) in a secure way using a special application on his/her mobile phone.

The proposed invention differs significantly from the described invention with ref. no. US 2009/0281904 A1 insofar as the mobile phone with the proposed invention serves only as an identification mean to identify the user and a communication mean for two-directional data transfer between the transaction processing centre and the shop's POS transaction terminal. This way the user does not need to enter any data on the selected service provider, the selected transaction or the amount of the transaction in its mobile phone. All the data is automatically determined when establishing the data connection between the transaction processing centre and the POS terminal, where the shop enters the amount of the payment. The proposed POS terminal enables simple integration with existent cash registers and the transaction is thus carried out in a faster, safer and more user-friendly way.

The patent document with ref. no. US 2009/0061888 A1 and title >>Transaction Method Between Two Servers Including a prior Validating Step using Two Mobile Telephones<< describes a system and a procedure for carrying out transactions between two servers with the prior step of validation by using two phones. The validation procedure is done in the following way. Server 1 sends the signal through a wireless communication network to the mobile terminal 1. Mobile terminal 1 reproduces the signal through its microphone. Mobile terminal 2, which is located near mobile terminal 1, receives the transmitted acoustic signal with its microphone. Mobile terminal 2 sends the received signal to server 2 through wireless telecommunication network. If server 2 confirms the validity of the received signal, communication connection is established between servers 1 and 2 and the transaction procedure is carried out between both servers.

The proposed invention differs significantly from the described invention with ref. no. US 2009/0061888 A1 insofar as the mobile phone with the proposed invention serves both as an identification mean to identify the user as well as a communication mean for two-directional data transfer between the transaction processing centre and the shop's POS transaction terminal. With the proposed system the transaction is not executed between two servers but between the transaction processing centre and the POS terminal.

The solution of presented in the patent document WO/2002/033669 with the title >>System for Payment Data Exchange and Payment Terminal Device Used Therein<< describes a system and a procedure for carrying out transactions between the transaction centre and the POS terminal using the user's mobile phone, which serves as an identification and communication mean. The user calls the transaction centre with an ordinary voice call using his/her mobile phone. A call connection is established and the transaction data is transferred in both directions between the transaction processing centre and the POS terminal in the form of sound-modulated signal using the user's mobile phone. Between the transaction centre and the mobile phone the data is transferred through the speech channel of the mobile network, and through the acoustic coupling between the user's phone and the POS terminal.

The present invention differs significantly from the described solution from WO/2002/033669 insofar as the data is transferred between the transaction processing centre and the mobile phone through the packet data-transfer network such as GPRS or UMTS, and not through the speech channel of the mobile network, the primary function of which is not transfer of sound-modulated data. This eliminates the problem of GSM encoder influencing the transfer of the modulation signal. Furthermore; in case of a POS terminal with one of the active connection forms, the data between the mobile phone and the POS terminal is only transferred in one direction (mobile phone→POS terminal). To carry out the transaction a special application has to be installed on the mobile phone, and an appropriate security certificate must be on the security module (SIM card or other secure memory of the mobile phone). With the proposed invention the transaction data is transferred between the mobile phone and the POS terminal not only through the acoustic coupling but also through the infrared data transfer (IrDA) or on the basis of Bluetooth data connection or NFC technology.

The patent document with ref. no. WO/2003/088165 and title >>Payment Terminal Device For Payment Data Exchange<< describes a POS payment terminal for carrying out mobile transactions with the user's mobile phone. The data that the transaction processing centre sends to the POS terminal goes through the speech channel of the mobile network in the form of sound-modulated data to the mobile phone, and from there in the form of an acoustic signal to the POS terminal, which in this case only includes a microphone. The POS terminal send the transaction data to the transaction processing centre through one of the forms of active connection.

The main advantage of the presented invention over the previously patented inventions with ref. no. WO/2002/033669 and WO/2003/088165 is that the data is not transferred through a speech channel of the mobile network, thus the quality and the speed of data transfer does not depend on the type of the speech encoder, which the mobile network automatically selects according to the available an demanded transfer capacities. The transaction is therefore carried out faster and more efficiently.

To carry out the transaction a special application has to be installed on the mobile phone, and an appropriate security certificate must be on the security module (SIM card or other secure memory of the mobile phone).

The core of the wireless mobile transaction system and the procedure for carrying out transactions with the mobile phone according to the invention is in the fact that the transfer of the transaction data between the user's mobile phone and the transaction processing centre is done using a secure connection based on GPRS or UMTS data packet transfer, whereas between the user's mobile phone and the shop's POS terminal the data is transferred using sound-modulated data transfer through an acoustic coupling or on the basis of infrared data association (IrDA) or Bluetooth wireless data connection or NFC contactless short-range communication technology or wireless internet connection WLAN. This way the user's mobile phone becomes a simple, safe and handy transaction instrument for carrying out financial transactions, such as electronic payment and transfer of funds, as well as non-financial transactions, such as using bonuses, collecting loyalty points and allowing and/or controlling access to secured areas, premises, buildings and similar. According to the invention the system is using operator's existent dedicated wireless data-transfer technology, e.g. GPRS or UMTS, for transferring data between the transaction processing centre and the mobile phone, and is performing identification of the user with the certificate which is securely stored on the user's SIM card or in the secure memory of the mobile phone.

BRIEF DESCRIPTION OF THE DRAWINGS

The system according to the invention shall be described in more detail with the help of the following figures.

DETAILED DESCRIPTION OF THE INVENTION

Figure 1:
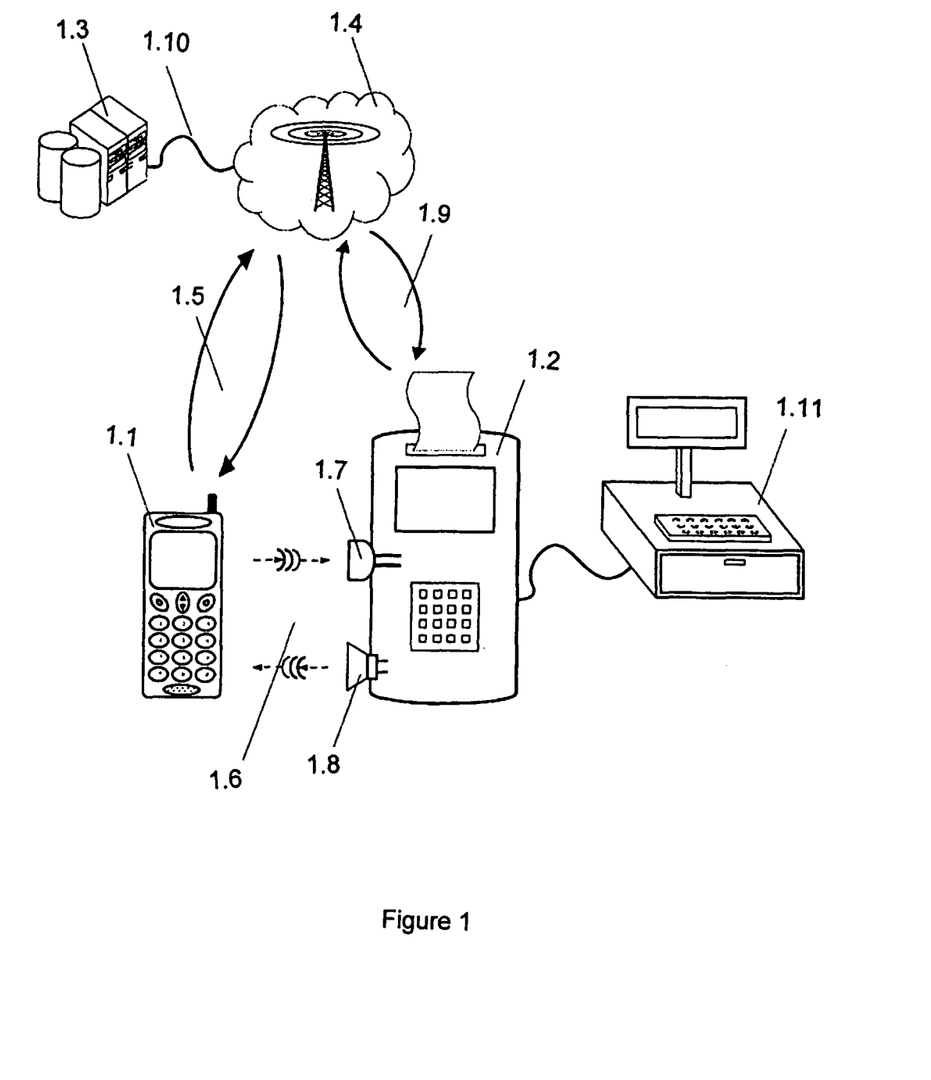
FIG. 1—Block scheme of the entire wireless mobile transaction system
Figure 3:
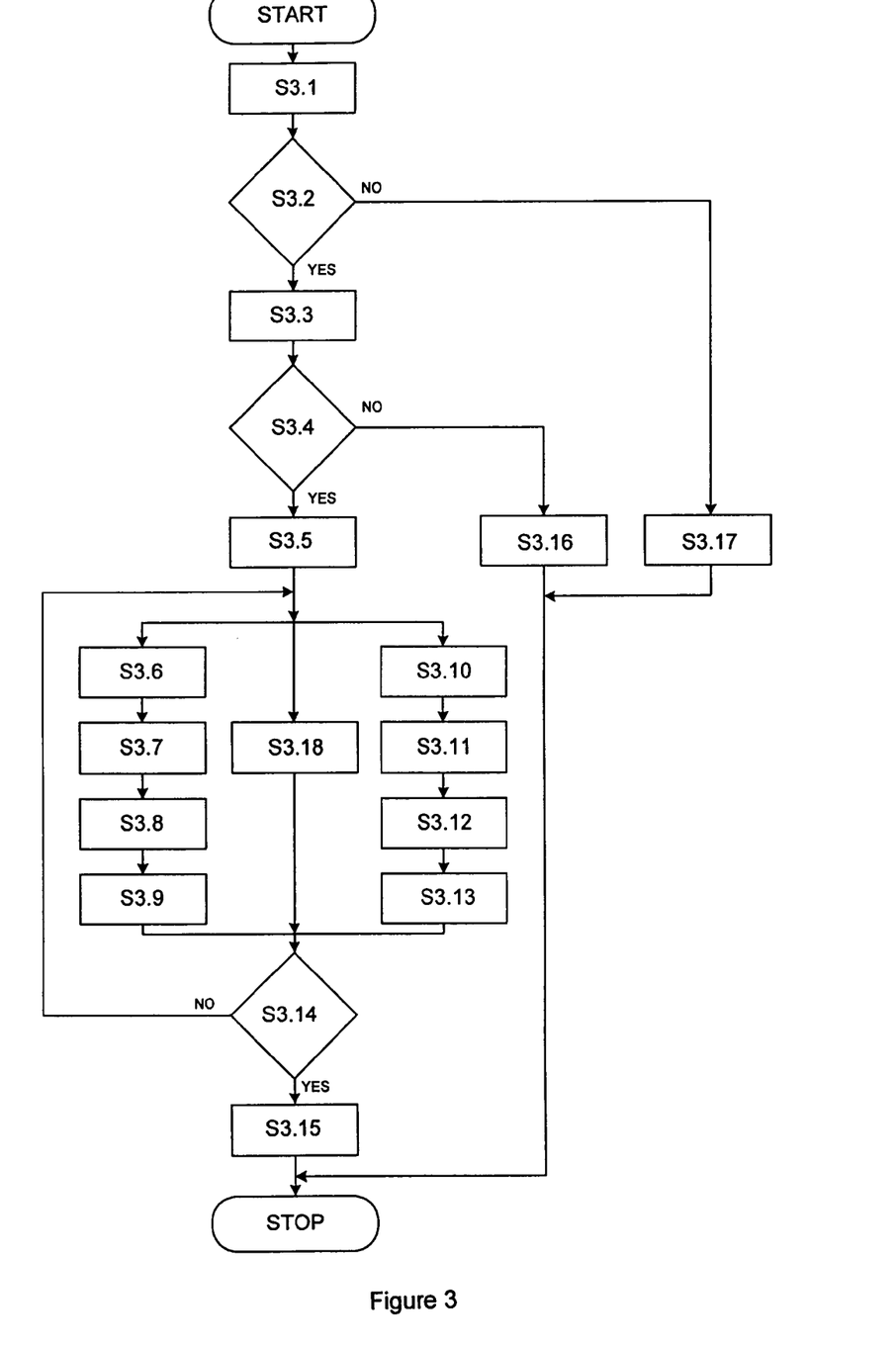

A wireless mobile transaction system according to the invention, shown in FIG. 1, consists of the user's mobile phone (1.1) on which an application according to the algorithm from FIG. 3 for carrying out an arbitrary financial or non-financial transaction is installed, transaction terminal (1.2), which may be a wired or wireless point-of-sale (POS) terminal, wireless payment terminal or other like terminal, whether fixed or mobile, the transaction processing centre (1.3) and the mobile network (1.4) of any service provider. In the direction from the transaction processing centre (1.3) to transaction terminal (1.2) the transaction data is first transferred through connection (1.10), which can be wired or wireless, to the mobile network (1.4), and then go through wireless connection (1.5), which can be UMTS or GPRS, to the user's mobile phone (1.1).

The wireless mobile transaction system according to version I includes a POS terminal with at least one mode of active connection (1.9). This can be a wired TCP/IP connection, such as Ethernet, or one of wireless forms of connection, such as WLAN, GPRS or UMTS. According to the invention a special application installed on the mobile phone (1.1) enables sound modulation and acoustic reproduction of the modulated signal, built on the basis of received transaction data from the transaction centre (1.3). The microphone (1.7) of the transaction terminal (1.2) captures the sound-modulated signal (1.6) from the mobile phone (1.1). The software of the transaction terminal (1.2) performs demodulation of the received sound-modulated signal (1.6) and further on processes the transaction data according to the requested operation. In case of a system according to version I, i.e. when the transaction terminal (1.2) has one of the abovementioned modes of own active connection, the transaction data is transferred from the transaction terminal (1.2) to the transaction processing centre (1.3) through active wireless WLAN, GPRS or UMTS or wired TCP/IP (Ethernet) connection (1.9).

The wireless mobile transaction system according to version II includes a transaction terminal (1.2) with no mode of active connection (1.9). In this case the transaction data is transferred to the transaction processing centre (1.3) entirely through the user's mobile phone (1.1) so that the algorithm or the software of the transaction terminal (1.2) performs sound modulation of the transaction data which is to be sent to the transaction centre (1.3). This is followed by acoustic reproduction of sound-modulated signal using a speaker (1.8) inbuilt in the transaction terminal (1.2). The microphone of the user's mobile phone (1.1) captures the acoustic modulation signal from the acoustic coupling (1.6). According to the invention special software of the mobile phone (1.1) performs demodulation of sound-modulated signal and sends the transaction data of the transaction terminal (1.2) to the transaction processing centre (1.3) through operator's wireless network (1.5).

Instead of an acoustic coupling (1.6) the data can be transferred between the user's mobile phone and the POS terminal in both version I (only in direction mobile phone—POS terminal) and version II (simultaneous full-duplex data transfer between the mobile phone and the POS terminal) also by using one of the short-range wireless data-transfer technologies, such as: IrDA, Bluetooth, WLAN or NFC. In this case the mobile phone and the POS terminal must in both versions I and II support the same technology. The transaction terminal (1.2) in this case does not need an inbuilt speaker (1.8) or the microphone (1.7). Neither are needed the procedures of acoustic modulation and demodulation of transaction data and acoustic reproduction or capture on the mobile phone and the POS terminal.

In the course of the transaction, the data can be exchanged between the transaction processing centre (1.3) and the transaction terminal (1.2) several times in accordance with the communication protocol. Data transfer can be done simultaneously in both directions (full duplex). Identification of the user is done using the identification data stored in a secure way on the SIM (SIM=Subscriber Identity Module) card of the user's mobile phone or in another secure memory of the mobile phone, and/or by entering a secret personal identification number (PIN=Personal Identification Number), which the user enters in his/her mobile phone (1.1) and/or transaction terminal (1.2) on the request of the application. The transaction terminal (1.2) can be connected to or integrated into the cash register or to other potential infrastructure of the point of sale (1.11). This way automatic forwarding of information on the amount of the purchase or using bonuses in case of bonuses and loyalty application from the cash register to the transaction terminal (1.2) or vice versa is enabled.

The procedure of carrying out a typical transaction includes the following steps:
1. the merchant enters the transaction data, such as payment amount, number of bonus points etc. into the transaction terminal (1.2), or the terminal receives them automatically through a wired or wireless connection with the cash register (1.11);
2. the customer starts an application for carrying out transactions on his/her mobile phone (1.1);
3. the customer enters his/her secret PIN number into his/her mobile phone (1.1) and/or into the transaction terminal (1.2);
4. the customer puts its mobile telephone to the transaction terminal (1.2) so that the speaker of the mobile phone (1.1) is near the microphone of the transaction terminal (1.2). When using one of the short-range wireless data-transfer technologies (e.g. IrDA, Bluetooth, WLAN, NFC) the user must also put his/her mobile phone to the terminal.

This way the transfer of transaction data between the transaction processing centre (1.3) and the transaction terminal (1.2) is entirely done through the customer's mobile phone (1.1) (in the system according to version II) or partly through the customer's mobile phone (1.1) and partly through the active connection (1.9) of the transaction terminal (1.2) with the transaction processing centre (1.3) (in the system according to version I);
5. the transaction terminal (1.2) reports when the transaction has been successfully completed and offers the possibility of printing receipts for the shop and the customer;
6. the customer confirms exiting the application.

Figure 2:
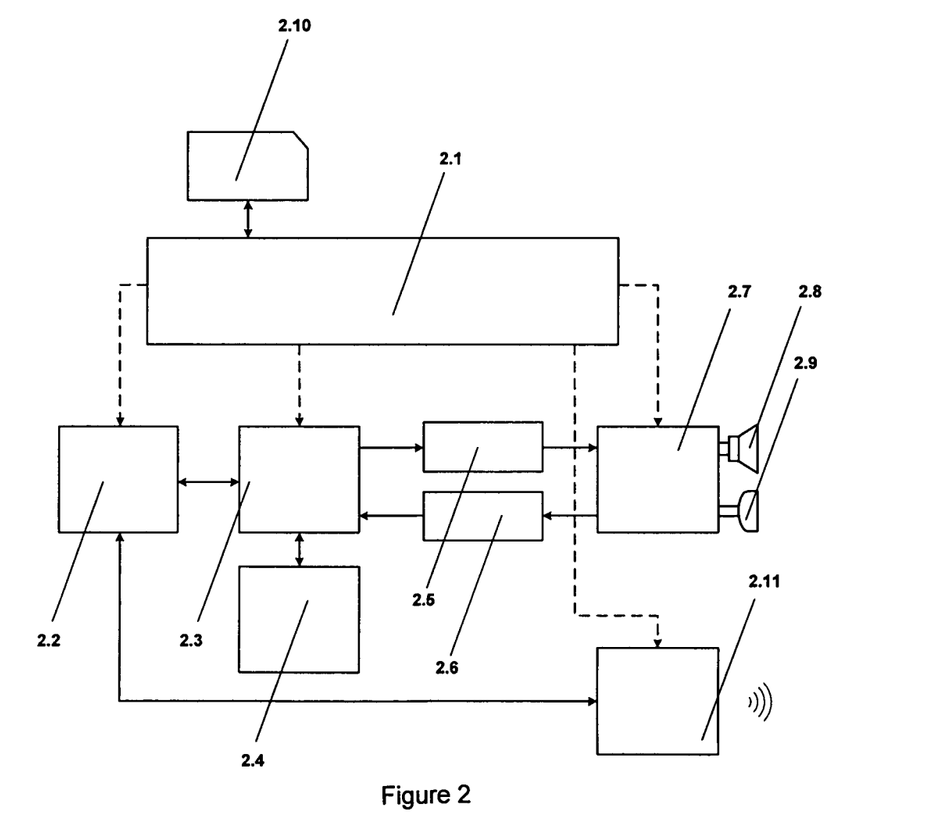
FIG. 2—Block scheme of module connections of the algorithm for carrying out a transaction on a mobile phone FIG. 3—Block scheme of the algorithm for carrying out a transaction on a mobile phone

FIG. 2 presents a block scheme of module connections of the algorithm for carrying out a transaction on a mobile phone. The control module (2.1) ensures the correct course of application and transaction from the moment the user starts the application on his/her mobile phone and chooses the mode of connection to the POS terminal (connection through the acoustic coupling or short-range wireless communication using IrDA, Bluetooth, WLAN or NFC). In the next step authenticity of the user and of the application is checked using the security certificate that is securely stored on the SIM card or another secure memory (2.10) of the mobile phone 1.1. Module (2.2) ensures a secure wireless connection to the transaction processing centre (1.3) through wireless packet connection enabled by the mobile network (1.4). Control over data transmission between the transaction processing centre (1.3) and the transaction terminal (1.2) through the acoustic coupling (1.6) is done by module (2.3). In the case of a system according to version II the data is transferred between modules (2.2) and (2.3) simultaneously in both directions (full-duplex mode), and module (2.3) ensures correct assembly and disassembly of data packets. Module (2.4) has the function of forward error correction. Module (2.4) calculates and adds redundant data to the data packet received by the transaction processing centre (1.3). Data packets with redundant information added are then sent to the modulator (2.5), which transforms them into a sound-modulated signal. The output audio encoder (2.7) together with the speaker (2.8) reproduces the acoustic modulation signal received and processed by the transaction terminal (1.2). In the opposite direction the microphone (2.9) together with the audio encoder (2.7) captures the acoustic modulation signal received from the transaction terminal (1.2). Demodulator (2.6) transforms the sound modulation signal into a sequence of data transaction packets. Module (2.3) ensures unpacking of the data packets. After completing error correction procedure, done by module (2.4) using the redundant data added to the data packet by the transaction terminal (1.2), the sequence of the transaction data is sent to the transaction processing centre (1.3) using data packet connection of module (2.2).

In case of a system according to version I when the transaction terminal (1.2) is connected through one of the forms of active wired or wireless data connection to the transaction processing centre (1.3), the data in the direction from the transaction terminal (1.2) to the centre (1.3) is not sent through the user's mobile phone (1.1). Modules (2.9) and (2.6) thus stay inactive, and module (2.4) only takes care of calculating and adding redundant data to data packets that are to be sent to the terminal (1.2).

When the user chooses one of the supported technologies of short-range wireless communication (IrDA, WLAN, Bluetooth or NFC) (2.11) for communication between the mobile phone and the POS terminal, the data is transferred between modules (2.2) and (2.11) simultaneously in both directions in case of a system according to version II, and in the direction from (2.2) to (2.11) in case of a system according to version I. In both cases when choosing this mode of communication modules (2.3), (2.4), (2.5), (2.6), (2.7), (2.8) and (2.9) stay inactive.

The functioning of the algorithm for carrying out the transaction on the user's mobile phone (1.1) is shown in FIG. 3. The course of the mobile transaction is started by the user starting the application and choosing the mode of communication (acoustic coupling or one of the short-range wireless technologies: IrDA, Bluetooth, WLAN, or NFC) with the POS terminal (START). Control module (2.1) starts. Afterwards through GPRS or UMTS packet connection module (2.2) executes step (S3.1) to establish data connection between the mobile phone (1.1) and the transaction processing centre (1.3). If step (S3.1) of establishing connection to the transaction processing centre (1.3) at the point (S3.2) is unsuccessful and has the result NO, the user of the mobile phone (1.1) is notified of this through step (3.17) and the application closes. If the answer at the point (S3.2) is YES, meaning the connection to the transaction processing centre (1.3) has been successfully established, the code of the mobile phone (1.1) user is read (S3.3) and the authenticity and the validity of the security certificate stored on the SIM card or in another secure memory of the mobile phone (1.1) are verified (S3.4). If the data of the user and the certificate (S3.4) do not match, the user of the mobile phone (1.1) is notified of this, and the application closes with step (S3.16). If the security certificate (S3.4) is verified and confirmed, one-directional data transfer (S3.5) from the transaction processing centre (1.3) through the user's mobile phone (1.1) to the transaction terminal (1.2) begins in the system according to version I, or a simultaneous data transfer (S3.5) in both directions between the transaction processing centre (1.3) and the transaction terminal (1.2) in case of a system according to version II. The logics for sending transaction data in the direction from the transaction processing centre (1.3) to the transaction terminal (1.2) through the acoustic coupling is the following (both in systems according to versions I and II): The transaction processing centre (1.3) receives the transaction data through GPRS or UMTS packet connection (S3.6), redundant information is added for forward detection and correction of errors on the terminal (S3.7) by module (2.4), and sound modulation (S3.8) of the received set of data is done. This is followed by acoustic reproduction of sound-modulated signal using the speaker (S3.9) of the mobile phone (1.1). The transaction data is transferred between the transaction terminal (1.2) and the transaction processing centre (1.3) only in case of a system according to version II, and this is done in the following way: First modulation signal (S3.10) transmitted by the speaker (1.8) of the transaction terminal (1.2) is captured. The signal (S3.10) is then demodulated, which is followed by forward error correction (FEC) (S3.12) and sending the transaction data (S3.13) towards the transaction processing centre (1.3). If the transaction (S3.14) is successfully completed, a notice is written on the screen of the mobile phone (1.1) in step (S3.15), and the application closes (STOP). If the answer to the transaction (S3.14) is NO, this means the transaction has not yet been completed and the procedure of data transfer in both directions (S3.5) continues until the transaction between the transaction terminal (1.2) and the transaction processing centre (1.3) is completed.

If the user in the step START instead of using the acoustic coupling chooses to use one of the supported technologies of short-range wireless communication (IrDA, WLAN, Bluetooth or NFC) (2.11) for communication between the mobile phone and the POS terminal, a one-directional (system according to version I) or full-duplex (system according to version II) data transfer (S3.18) is performed according to the chosen communication mode using the appropriate module (2.11). Steps (S3.6), (S3.7), (S3.8), (S3.9), (S3.10), (S3.11), (S3.12) and (S3.13) are in this case not performed.

The wireless mobile transaction system and the procedure for carrying out the transaction with a mobile phone according to the invention provides the user of the mobile phone with a safe, reliable, fast and handy way of carrying out various transactions. Here transaction is meant in a broader sense and can include financial transactions where a transfer of monetary funds from one account to another is done, or a transfer of funds between two clients at a purchase, buying credits for different purposes, buying gift certificates and similar as well as non-financial transactions such as collecting and using loyalty points and similar. Using the solutions of the invention a modern mobile phone becomes a multipurpose device, which inter alia substitutes various cards and enables a simple and transparent way of shopping, buying credits and carrying out bank transactions. The system exploits the technical capacities of existent networks. Besides this, the presented solution eliminates the problems occurring in transfer of sound-modulated data through a speech channel of the mobile network, as dedicated wireless data-transfer technology, such as GPRS or UMTS, is used for transferring data between the transaction processing centre and the mobile phone. Carrying out mobile transactions thus no longer depends on speech encoders, and is at the same time faster, as higher bit-speeds can be used because of simpler techniques of forward error correction.

The invention claimed is:

1. A method of carrying wireless mobile transactions, comprising:
   starting an application at a mobile terminal;
   receiving, at said mobile terminal, input indicative of a selected mode of communication between said mobile terminal and a transaction terminal;
   establishing a packet data connection between said mobile terminal and a transaction processing center;
   examining a security certificate retrieved from a storage element within said mobile terminal or a personal identification number (PIN) input by a user to verify said security certificate, and thereby determine if said packet data connection has been successfully established; and
   transmitting transaction data between said transaction processing centre and said transaction terminal, if said security certificate is verified;
   wherein at least part of said transaction data is transmitted between said transaction processing center and said transaction terminal through said mobile terminal,
   wherein data between said mobile terminal and said transaction terminal is transmitted in accordance with said selected mode of communication, and
   wherein said selected mode of communication between said mobile terminal and said transaction terminal is acoustic coupling, further comprising, at said mobile terminal, sound modulating and acoustically reproducing transaction data received at said mobile terminal for said transaction terminal.

2. The method of claim 1, wherein said mode of communication is one of an acoustic coupling or a short-range wireless communication technology comprising IrDA, Bluetooth, WLAN, Wireless USB, and NFC.

3. The method of claim 1, further comprising transferring transaction data in the direction from said transaction processing center to said transaction terminal via a wireless connection including UMTS, GPRS and/or WLAN to said mobile terminal and processing said transaction data at said mobile terminal for further transmission, and further transferring said transaction data from said mobile terminal to said transaction terminal in accordance with said selected mode of communication.

4. The method of claim 1, further comprising:
   transferring transaction data in the direction from said transaction terminal to said transaction processing center through said mobile terminal,
   sound modulating said transaction data at said transaction terminal;
   acoustically reproducing said sound-modulated signal using a speaker inbuilt in the transaction terminal;
   capturing the acoustically modulated signal via a microphone at said mobile terminal; and
   demodulating said captured signal and sending the obtained transaction data to said transaction processing center through said wireless connection.

5. The method of claim 1, wherein part of said transaction data is transmitted via an active wireless or wired data connection to said transaction processing center from said transaction terminal, and said connection is a WLAN, GPRS, UMTS or wired TCP/IP connection.

6. The method of claim 1, further comprising notifying the user of the mobile terminal if the step for establishing connection between the mobile phone and the transaction processing centre and/or the step of verification of said security certificate is not successful.

7. The method of claim 6, further comprising closing the application after said notification.

8. The method of claim 1, wherein said verification comprises:
   reading the PIN of the mobile application user;
   verifying the authenticity and validity of the security certificate stored on a SIM card or another secure memory of the mobile terminal; and
   if the personal user data and the security certificate do not match, notifying the user by an application control module, which generates an acoustical as well as graphical signal which are then presented on the mobile terminal's speaker and screen, respectively, and closing the application; or
   if the security certificate is verified and confirmed, initiating data transfer between the transaction processing centre and the transaction terminal in at least one direction.

9. A wireless mobile transaction system, comprising:
   a mobile terminal, a transaction terminal, and a transaction processing center,
   wherein the mobile terminal comprises a mobile application with graphical user interface and with capability to control one or more of the mobile terminal's data transmission modules, and which has access to a secure memory element of the mobile terminal;
   wherein the mobile terminal is configured for
      (a) receiving input indicative of a mode of communication between said mobile terminal and said transaction terminal;
      (b) establishing a packet data connection between said mobile terminal and a transaction processing center; and
      (c) if said packet data connection has been successfully established, examining a security certificate retrieved from said secure memory element or a personal identification number (PIN) input by a user; or, if said security certificate is verified, adapting the mobile terminal and the transaction processing center for transaction data transmission;
   wherein the mobile terminal is configured such that at least part of said transaction data is transmitted between said transaction processing center and said transaction terminal through said mobile terminal, wherein data between said mobile terminal and said transaction terminal is transmitted in accordance with said selected mode of communication, and
   wherein the mobile application comprises functions for implementation of the acoustic modulator and demodulator and levels of control over sending, receiving, confirming and verifying data packets sent through the acoustic coupling.

10. The wireless mobile transaction system of claim 9, comprising a special application for carrying out the transaction on the mobile phone which can operate on any mobile platform that enables installing applications with access to a sound encoder or to one or several short-range wireless communication technologies, and control over one of the wireless packet connections.

11. The wireless mobile transaction system of claim 10, wherein radiofrequency modes of full-duplex wireless data transfer between the mobile phone and the POS terminal supported by the special application for carrying out transactions on a mobile phone include one of Bluetooth, WLAN, NFC, and IrDA.

12. The wireless mobile transaction system of claim 9, configured so that it enables full-duplex data transfer between the transaction processing center and the transaction terminal which is security-wise faultless both on the level of data transfer through the mobile operator's data packet network and with data transfers through said selected mode of communication.

13. The wireless mobile transaction system of claim 12, where said selected mode of communication comprises an acoustic coupling or short-range wireless communication mode including IrDA, Bluetooth, WLAN, or NFC.

* * * * *